US009612592B2

(12) United States Patent
Pueschl

(10) Patent No.: US 9,612,592 B2
(45) Date of Patent: Apr. 4, 2017

(54) METHOD FOR REAL-TIME TESTING OF A CONTROL UNIT FOR AN INTERNAL COMBUSTION ENGINE USING A SIMULATOR

(71) Applicant: dSPACE digital signal processing and control engineering GmbH, Paderborn (DE)

(72) Inventor: Thorsten Pueschl, Paderborn (DE)

(73) Assignee: dSPACE digital signal processing and control engineering GmbH, Paderborn (DE)

( * ) Notice: Subject to any disclaimer, the term of this patent is extended or adjusted under 35 U.S.C. 154(b) by 813 days.

(21) Appl. No.: 13/647,713

(22) Filed: Oct. 9, 2012

(65) Prior Publication Data

US 2013/0090886 A1    Apr. 11, 2013

(30) Foreign Application Priority Data

Oct. 6, 2011   (DE) .................. 10 2011 054 217

(51) Int. Cl.
    G05B 17/02      (2006.01)
    G01M 15/02      (2006.01)
    (Continued)

(52) U.S. Cl.
    CPC ............. *G05B 17/02* (2013.01); *F02D 41/26* (2013.01); *F02D 2041/1437* (2013.01); *G01M 15/02* (2013.01)

(58) Field of Classification Search
    CPC .................. G05B 17/02; G01M 15/02; F02D 2041/1437; F02D 41/26
    See application file for complete search history.

(56) References Cited

U.S. PATENT DOCUMENTS 7,933,734 B2 * 4/2011 Bruski et al. ................ 702/117
8,428,914 B2   4/2013 Frochte
(Continued)

FOREIGN PATENT DOCUMENTS

CN    1014145112 A   6/2009
DE    100 47 082 A1  5/2001
(Continued)

OTHER PUBLICATIONS

Isermann et al., "Hardware-in-the-loop simulation for the design and testing of engine-control systems" Control Engineering Practice 7 (1999) 643-653.*
(Continued)

*Primary Examiner* — Alexander Satanovsky
*Assistant Examiner* — John Kuan
(74) *Attorney, Agent, or Firm* — Muncy, Geissler, Olds & Lowe, P.C.

(57) ABSTRACT

A method for real-time testing of a control unit for an internal combustion engine using a simulator is provided. The control unit and the simulator are connected to one another by a first data channel. The control unit transmits engine control data to the simulator through the first data channel and the simulator calculates engine state variables in real time on its first simulator processor with a first sampling step size and transmits at least some of the engine state variables to the control unit. Thus, selected engine state variables can be made available at a different frequency, and in particular at a higher frequency, than is possible by the first sampling step size of the first simulator processor, in that the simulator calculates at least one specific engine state variable using a partial engine model and with a second sampling step size different from the first sampling step size.

21 Claims, 2 Drawing Sheets

(51) Int. Cl.
*F02D 41/14* (2006.01)
*F02D 41/26* (2006.01)

(56) References Cited

U.S. PATENT DOCUMENTS

| | | | |
|---|---|---|---|
| 2006/0277010 | A1 | 12/2006 | Schutte et al. |
| 2007/0137612 | A1* | 6/2007 | Gaertner ............... F02D 35/028 123/305 |
| 2007/0251233 | A1* | 11/2007 | Bardoll .................. F02B 37/24 60/602 |
| 2007/0272173 | A1* | 11/2007 | Reckels ................. F01P 7/167 123/41.11 |
| 2009/0118914 | A1* | 5/2009 | Schwenke et al. ............. 701/51 |
| 2010/0049486 | A1* | 2/2010 | Xu et al. ............................ 703/6 |
| 2010/0063790 | A1* | 3/2010 | Truscott et al. .................. 703/8 |

FOREIGN PATENT DOCUMENTS

| | | |
|---|---|---|
| DE | 10 2005 026 040 A1 | 12/2006 |
| EP | 1 806 636 A1 | 7/2007 |
| EP | 2 157 488 A2 | 2/2010 |
| JP | H 11-326135 A | 11/1999 |
| JP | 2009-008473 A | 1/2009 |
| JP | 2009-289266 A | 12/2009 |
| JP | 4663689 B2 | 4/2011 |
| WO | WO 2010/026086 A1 | 3/2010 |

OTHER PUBLICATIONS

Yang et al., "A Mixed Mean-Value and Crank-Based Model of a Dual-Stage Turbocharged SI Engine for Hardware-In-the-Loop Simulation" 2010 American Control Conference Marriott Waterfront, Baltimore, MD, USA Jun. 30-Jul. 2, 2010.*

Rabbath et al., "Effective Modeling and Simulation of Internal Combustion Engine Control Systems" Proceedings of the American Control Conference Arlington, VA Jun. 25-27, 2001.*

Kimura et al., "Development of Engine Control System using Real Time Simulator" Proceedings of the 1996 IEEE International Symposium on Computer-Aided Control System Design, Dearborn, MI Sep. 15-18, 1996.*

Schulze et al., "Crank Angle-Based Diesel Engine Modeling for Hardware-in-the-Loop Applications with In-Cylinder Sensors," SAE Technical Paper, 2007 World Congress, pp. 1-19 (Apr. 2007).

"MAN Nutzfahrzeuge AG/Grosse Brummis simuliert auf schnellen Prozessoren," Innovation, www.man-mn.com (2009).

Japanese Office Action for Japanese Application No. 2012-222910 dated Feb. 12, 2015 with English translation.

Chinese First Office Action for Chinese Application No. 20120322295.5 dated Aug. 27, 2015—English translation.

"HiL-Simulation in der Praxis: Hochdynamische Regelung des Zylinderdruckverlaufs," Press Release, TESIS DYNAware (Nov. 13, 2008).

* cited by examiner

METHOD FOR REAL-TIME TESTING OF A CONTROL UNIT FOR AN INTERNAL COMBUSTION ENGINE USING A SIMULATOR

This nonprovisional application claims priority under 35 U.S.C. §119(a) to German Patent Application No. DE 102011054217.5, which was filed in Germany on Oct. 6, 2011, and which is herein incorporated by reference.

BACKGROUND OF THE INVENTION

Field of the Invention

The present invention relates to a method for real-time testing of a control unit for an internal combustion engine using a simulator, and also relates to a simulator, wherein the simulator comprises a first simulator processor and a first simulator I/O interface, wherein the control unit comprises a control unit processor and a control unit I/O interface, and wherein the control unit and the simulator are connected to one another through their I/O interfaces by means of a first data channel, and the control unit transmits engine control data to the simulator through the first data channel, and the simulator calculates engine state variables in real time on its first simulator processor with a first sampling step size using the engine control data and using a full engine model and transmits at least some of the engine state variables to the control unit.

Description of the Background Art

A generic method for performing a real-time test of a control unit is also known in practice as a hardware-in-the-loop test. Simulators of the generic type for carrying out such a method are known under the names hardware-in-the-loop simulator or HIL simulator. "Hardware-in-the-loop test" is understood to mean that the hardware to be tested—here in the form of a control unit—is not tested in its real environment—in the present case, in conjunction with the internal combustion engine that is to be operated—but instead in an environment that is at least partially simulated in the simulator. To this end, the simulator is connected to the control unit through the corresponding I/O interfaces in each case, so that the simulator receives the electrical signals output by the control unit, causes them to be included in the calculation of the full engine model, and in turn calculates data in real time that are sent to the control unit in the form of signals through the data channel between the simulator and the control unit, for example. Here, the term data channel describes a suitable connection for transmitting data or signals, for example a bus connection, which can also comprise additional subchannels. In this context, "real time" means that the engine state variables are calculated so quickly that for all practical purposes the control unit cannot detect whether it is being operated with a real engine or only in a simulated environment. In order for this to function, the first simulator I/O interface additionally must be matched in terms of hardware and signals such that it seems like the I/O interface of the real engine to the control unit.

The advantages of such a testing method are obvious: it is possible to verify the behavior of the control unit in a completely risk-free manner, with a good capability for observing the control unit and with the capability of exploring even extreme operating situations, and thereby ascertaining whether the control unit drives and monitors the engine as expected. Since engine state variables are transmitted from the simulator to the control unit and engine control data are transmitted from the control unit to the simulator via the data channel on a continuous basis, the control unit is tested "in the control loop" (hence "in the loop.")

It is immediately obvious that the quality of such a real-time test of a control unit depends critically on the quality of the underlying mathematical model, hence the full engine model, and from the most precise possible calculation of this full engine model. Thermodynamic models of internal combustion engines typically have comprehensive systems of differential equations that must be solved numerically in real time in order to obtain the engine state variables of interest. When mention is made herein that the simulator has a full engine model, this is only intended to mean that it is possible with the full engine model to calculate all of the engine state variables that are required in order to appropriately stimulate the control unit under test that is connected to the simulator, which is to say to supply it with all necessary engine state variables via the data channel. In particular, if the control unit requires cylinder internal pressure as an input quantity, it is necessary to employ a full engine model that models the thermodynamic processes in the cylinder. The complexity of typical full engine models places great demands on the simulator processor, which must calculate the engine state variables of interest in each sampling step.

A problem can arise, for example, when the control unit makes it necessary to provide engine state variables at a frequency that does not correspond to the sampling step size of the simulator processor, and in particular is greater than the frequency defined by the first sampling step size of the simulator processor. Another problem can arise because engine state variables are to be transmitted at different, and in particular variable, time intervals than is possible with the first, fixed sampling step size of the simulator. A specific example of such an engine state variable is the cylinder pressure in the combustion chamber of a cylinder, wherein the pressure in the cylinder is provided to the control unit for each cylinder of the internal combustion engine. One example of such an HIL system is described in the German press release titled "HiL-Simulation in der Praxis: Hochdynamische Regelung des Zylinderdruckverlaufs."

Modern control units require reporting of cylinder pressures not at fixed time intervals, but at, e.g., fixed intervals of crank angle, which is to say the angle of rotation of the crankshaft, for example one value for each degree of crank angle, and in particular over the full speed range of the engine. At a speed of 6000 RPM, this means that the calculation of the full engine model can last barely 30 µs in order to be able to provide a calculated value for the cylinder pressure or cylinder pressures to the control unit at every degree of change in the crank angle. Depending on the complexity of the full engine model this cannot be implemented, with the result that real-time conditions cannot be maintained.

SUMMARY OF THE INVENTION

It is therefore an object of the present invention to provide a method for real-time testing of a control unit for an internal combustion engine that makes it possible to provide selected engine state variables, in particular at a higher frequency than is possible by means of the first sampling step size of the first simulator processor. The object is also to provide a simulator for carrying out such a method.

The object, according to an embodiment, is attained in a method for real-time testing of a control unit for an internal-combustion engine using a simulator by the means that the simulator calculates at least one specific engine state variable of the engine state variables using a partial engine model and with a second sampling step size different from the first sampling step size. The specific engine state variable is at least one engine state variable of the full engine model that is to be provided at different times than is specified by the first sampling step size of the first simulator processor, which is to say in particular at a higher frequency or at variable times.

The partial engine model is used to calculate this specific engine state variable; this model exists in addition to the full engine model, but permits a calculation of the specific engine state variable that conforms to the time requirements for providing this specific engine state variable. This means that the full engine model continues to provide all engine state variables at the first sampling step size, including the selected specific engine state variable. The partial engine model can access the value for one of the engine state variables calculated and made available by the full engine model in a last sampling step and uses it as the initial value for an independent calculation of the specific engine state variable. Starting from at least one such initial value calculated with the relatively complex full engine model, the partial engine model selectively permits a different, in particular faster, calculation of the selected specific engine state variable independent of the first sampling step size and independent of the calculation of the full engine model.

In general, the partial engine model is not merely a part of the full engine model. The term is intended to express that this is a mathematical model of the engine that concerns itself primarily with calculating the specific engine state variable and thus takes into account only a portion of the aspects that are taken into account by the full engine model. The partial engine model can be a different type of physical/technical model than that represented by the full engine model. While the full engine model is typically based on a system of differential equations, the partial engine model can typically be based on extrapolation from past calculated data and engine state variables.

Especially when the specific engine state variable must be calculated much more frequently by the partial engine model, and possibly transmitted to the control unit, which is to say that the second sampling step size is smaller than the first sampling step size, this may be problematic with regard to the utilization of the first data channel, since the more frequent transmission of the specific engine state variable to the control unit via the first data channel loads the first data channel in such a manner that on-time transmission of the engine state variables bound to the first sampling step size can no longer be guaranteed. To solve this problem, provision is made in an embodiment of the method that the specific calculated engine state variable is transmitted to the control unit via a second data channel different from the first data channel. It is not critical in this regard whether this data channel uses the existing first simulator I/O interface and the existing control unit I/O interface or whether this takes place via additional interfaces; all that is important here is that the first data channel and the second data channel are independent of one another. However, provision is made in an embodiment of the method according to the invention for the second data channel to be implemented by a second simulator I/O interface that is independent from the first simulator I/O interface.

The method according to an embodiment of the invention, can be put to especially practical use when the second sampling step size is smaller than the first sampling step size, and particularly when the first sampling step size is an integer multiple of the second sampling step size. This can involve sampling step sizes that are fixed in terms of time, but the sampling step sizes can also be tied to reference quantities other than time, for example the angle of the crankshaft of the simulated engine, which is to say the crank angle. The thermodynamic full engine model can be calculated once every 10° of crank angle change, for example, whereas the partial engine model is calculated at every 1° of crank angle change to calculate the specific engine state variable.

The transmission of the calculated engine state variables of interest to the control unit via the first data channel is not necessarily coupled to the first sampling step size, although it can be coupled thereto. Nor is the second sampling step size at which the specific engine state variable is calculated necessarily coupled to the transmission step size at which the specific engine state variable is transmitted to the control unit. For the case in which a first and a second data channel are implemented, however, provision is made in another embodiment for the specific engine state variable to be transmitted to the control unit via the second data channel at a smaller transmission step size than the transmission step size at which the engine state variables are transmitted to the control unit via the first data channel. The method can be carried out in a simplified manner such that the first sampling step size corresponds to the first transmission step size and/or such that the second sampling step size corresponds to the second transmission step size, so that the processing of the associated I/O routines can be linked to the calculation routines.

In an embodiment of the method, provision is made for the partial engine model for calculating the specific engine state variable to be calculated on a second simulator processor that is different from the first simulator processor, wherein this second simulator processor can be an independent processor or microcontroller, but can also be one core of a multi-core processor. What is important here is that the calculation of the specific engine state variable of the partial engine model does not influence the calculation of the engine state variables with the full engine model, which is to say computing capacities that are independent of one another are available for the calculation.

Another embodiment of the method according to the invention provides that the partial engine model for calculating the specific engine state variable is only carried out in a different task from the task in which the full engine model for calculating all engine state variables is carried out, which is to say in particular that both tasks are carried out on the first simulator processor. Here, too, it is necessary to bear in mind that the partial engine model is not merely an external part of the full engine model, but instead exists in addition to the full engine model, yet is designed such that a faster calculation of the partial engine model, in particular, is possible than the calculation time for calculating the engine state variables achievable with the full engine model.

The inventive method can be used, for example, when the full engine model includes the cylinder pressure inside the combustion chamber of a cylinder of the internal combustion engine as one of the engine state variables, and the partial engine model also includes the cylinder pressure inside the cylinder of the internal combustion engine as a specific engine state variable. In this context, it is important to bear in mind that in the case of multi-cylinder engines, the full engine model calculates the cylinder pressures in all of the engine's cylinders, as does the partial engine model. In certain engines, it is possible that symmetries may be utilized, thus reducing computational effort. When the cylinder pressure inside the combustion chamber of a cylinder is referred to below, then of course this means that the cylinder pressures inside the combustion chambers of any additional cylinders can also be included.

The cylinder pressure inside a cylinder is an essential engine state variable for controlling an internal combustion engine, which is transmitted to the engine control unit at regular intervals, in particular with respect to a predetermined change in the crank angle. Conversely, the control unit transmits the injection time and ignition angle (in internal combustion engines with externally supplied ignition) for each cylinder as a function of the engine state variables to drive the internal combustion engine. In an embodiment of the method, the full engine model includes as additional engine state variable(s), and the partial engine model includes as additional specific engine state variable(s), the temperature inside the combustion chamber of the cylinder and/or the temperature gradient of the temperature inside the combustion chamber of the cylinder and/or the volume of the combustion chamber of the cylinder and/or the pressure gradient inside the combustion chamber of the cylinder. With these variables, the cylinder pressure inside the combustion chamber of the cylinder, in particular, can be calculated in a simple manner without requiring a complex differential equation system to be solved, and in particular, the calculation of the cylinder pressure within the framework of the partial engine model is then possible such that it only takes a fraction of the calculation time of the full engine model.

In an embodiment, the cylinder pressure inside the combustion chamber of a cylinder can be calculated with the partial engine model as a function of the current temperature and volume values, which likewise are calculated within the partial engine model. Using as a starting point the last values calculated with the full engine model for $p_0$ for the cylinder pressure, $V_0$ for the volume of the cylinder's combustion chamber, and $T_0$ for the temperature inside the combustion chamber, the cylinder pressure $p_k$ is calculated for points in time extending beyond that—before the next sampling size step is reached, for example, in a simplified fashion using:

$$p_k = p_0 \cdot \frac{V_0}{T_0} \cdot \frac{T_k}{V_k} \qquad (1)$$

Here, $p_k$ is the calculated value of the cylinder pressure in step k, which is calculated with the second sampling step size of the partial engine model, and $T_k$ and $V_k$ are the values calculated in the partial engine model for the temperature inside the combustion chamber of the cylinder and for the volume of the cylinder's combustion chamber.

The temperature $T_k$ in the cylinder's combustion chamber advantageously can be determined within the framework of the partial engine model through integration or extrapolation, for example using:

$$T_k = T_0 + T_{S2} \cdot k \cdot dT_0 \qquad (2)$$

Here; $T_{S2}$ is the second sampling step size, with which the partial engine model is calculated, and $dT_0$ is the value for the temperature gradient of the temperature inside the combustion chamber determined at the most recent calculation time by the full engine model.

In another embodiment of the invention, the volume $V_k$ of the combustion chamber of the cylinder is determined as a function of the crank angle $\phi$ in the partial engine model. In one embodiment, the volume is calculated by means of a series expansion, so that the following applies:

$$V_k(\phi) = \alpha_0 + \alpha_1(\phi_0 - \phi) + \alpha_2(\phi_0 - \phi)^2 + \ldots \qquad (3)$$

The volume of the combustion chamber of the cylinder behaves in a manner that is periodic, for example sinusoidal, with the crank angle, so that the series expansion preferably takes place only for a crank angle range of 0° to 180°, where a further subdivision into sub-ranges can take place here so that only a few powers are required in the series expansion for the calculation. Then, for example, one of three different series expansions $V_{k,1}$, $V_{k,2}$, or $V_{k,3}$ may come into play in the subdivision of the angle range into three sub-ranges as a function of the value of the crank angle $\phi$.

In another embodiment, the volume as a function of the crank angle $\phi$ is stored in a table such that it is accessible to the partial engine model.

The simulator according to the invention has a first simulator processor and a first simulator I/O interface for carrying out a real-time test of a control unit, wherein the control unit is equipped with a control unit processor and a control unit I/O interface. The simulator can be connected to the control unit via the simulator I/O interface and the control unit I/O interface by means of a first data channel to transmit engine control data from the control device to the simulator. A full engine model that is configured to calculate engine state variables on the first simulator processor as a function of the transmitted engine control data with a first sampling step size is maintained on the first simulator processor. The simulator is configured to transmit at least a portion of the engine state variables to the control unit with a first sampling step size, in particular via the first data channel. According to an embodiment of the invention, a partial engine model for calculating at least one specific engine state variable of the engine state variables with a second sampling step size $T_{S2}$ different from the first sampling step size $T_{S1}$ is maintained in the simulator, so that the above-described method according to the invention can be performed by means of the simulator.

In particular, now, there are a variety of possibilities for designing and further developing the method according to the invention for real-time testing of a control unit for an internal combustion engine, as well as for designing and further developing the simulator according to the invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
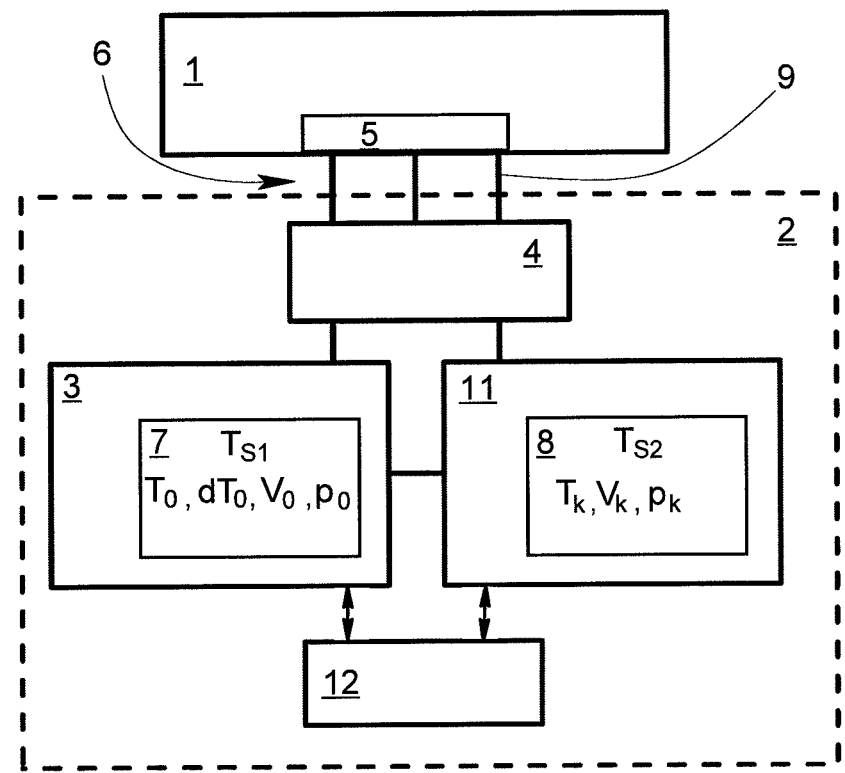
FIG. 1 schematically shows an arrangement having a control unit and a simulator for carrying out the method according to an embodiment of the invention for real-time testing of the control unit.

Shown schematically in the figures in each case is a control unit 1 for an internal combustion engine, and a simulator 2 that is used to subject the control unit 1 to a real-time test. To start with, the simulator 2 includes a first simulator processor 3 and a first simulator I/O interface 4. The control unit 1 likewise includes a control unit processor, which is not expressly shown here, and a control unit I/O interface 5. Implemented between the I/O interfaces 4 and 5 is a first data channel that connects the control unit 1 to the simulator 2.

The control unit 1 transmits engine control data to the simulator 2 through the first data channel 6. The simulator 2 calculates the engine state variables of interest in real time on its first simulator processor 3 based on the engine control data and by means of a full engine model 7 with a first sampling step size $T_{S1}$, so that the engine state variables of the full engine model 7 are available as a result at the end of each calculation interval delimited by the first sampling step size. Listed as engine state variables in FIG. 1 are the temperature $T_0$ inside the cylinder's combustion chamber, the temperature gradient $dT_0$, the volume $V_0$ of the cylinder's combustion chamber, and the cylinder pressure $p_0$ inside the cylinder.

The method carried out using the simulator 2 provides for the simulator 2 to calculate at least one specific engine state variable, in the present case the cylinder pressure p inside the combustion chamber of a cylinder, with a partial engine model 8 and with a second sampling step size $T_{S2}$ that is different from the first sampling step size $T_{S1}$. The partial engine model 8 thus is not an external part of the full engine model 7, but instead represents an additional calculation possibility for the specific engine state variable that makes it possible in the present case to provide the specific engine state variable with a second sampling step size $T_{S2}$ that is smaller than the first sampling step size $T_{S1}$. Preferably the state variables most recently calculated by the full engine model 7 are made available to the partial engine model 8. The partial engine model 8 uses the engine state variables made available by the full engine model 7 for a calculation of the specific engine state variable that is independent of the full engine model 7.

Figure 2:
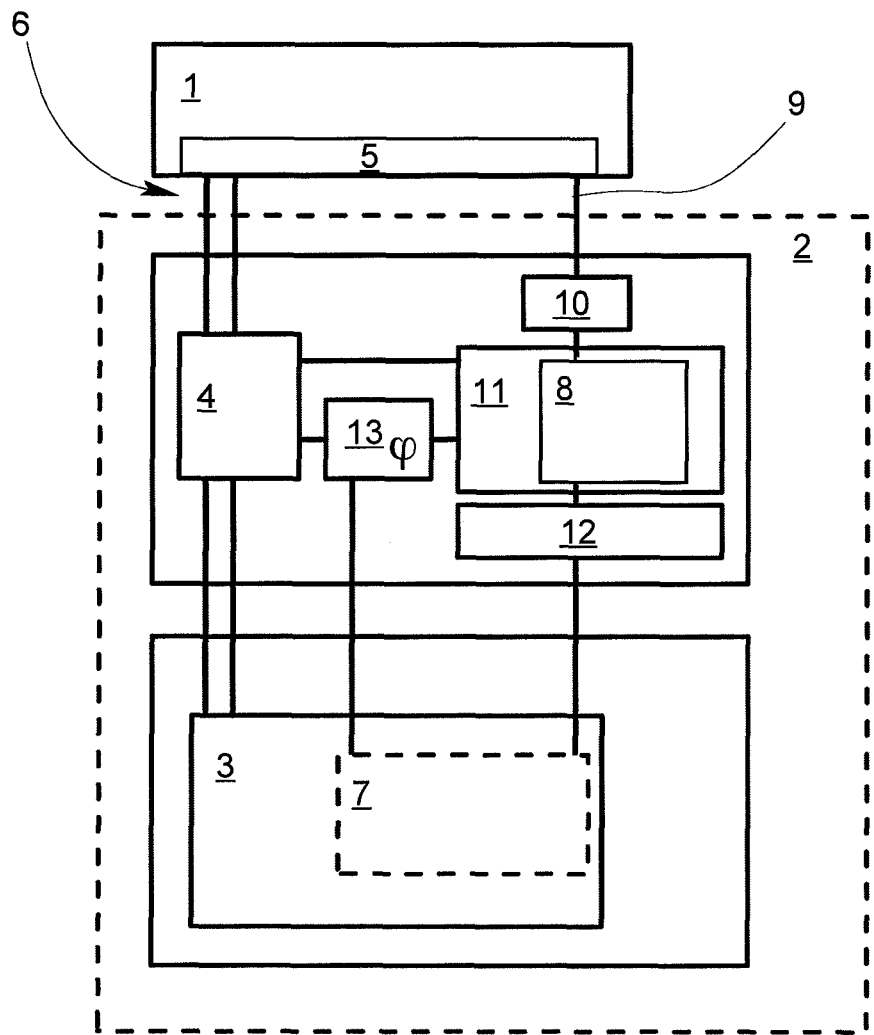
FIG. 2 shows a variant arrangement having a control unit for an internal combustion engine and a simulator for explaining the method according to the invention.

The exemplary embodiments in FIG. 1 and FIG. 2 have in common that the specific calculated engine state variable p is transmitted to the control unit 1 via a second data channel 9 different from the first data channel 6, wherein the second data channel 9 in the exemplary embodiment from FIG. 1 is created using the first simulator I/O interface 4 and the control unit I/O interface 5. In the exemplary embodiment from FIG. 2, the second data channel 9 is implemented using a second simulator I/O interface 10, independent of the first simulator I/O interface 4, and the control unit I/O interface 5. The control unit I/O interface 5 cannot be changed without additional effort on the control unit 1 itself, since the connection schematic and the interface are predefined, at least for production-model control units.

In both exemplary embodiments, the partial engine model 8 for calculating the specific engine state variable is calculated on a second simulator processor 11 different from the first simulator processor 3, resulting in the greatest possible degree of hardware decoupling between the calculation of the full engine model 7 and the calculation of the partial engine model 8. The first simulator processor 3 and the second simulator processor 11 both have access to the memory 12, which in the present case is implemented as dual-port memory, in other words as memory accessible from both sides.

In the exemplary embodiment in FIG. 2, the calculation of the full engine model 7 and the calculation of the partial engine model 8 are not performed at fixed time intervals, but instead as a function of the crank angle φ, so that the first sampling step size $T_{S1}$ and the second sampling step size $T_{S2}$ depend on the speed of the simulated internal combustion engine.

The full engine model 7 makes the engine state variables $T_0$, $dT_0$, $V_0$, and $p_0$ available at the end of each first sampling step size $T_{S1}$, with these engine state variables being stored in the memory 12. There, the engine state variables are available to the partial engine model 8, which then calculates intermediate cylinder pressures $P_k$ at intermediate step sizes, in the present case using the rules set forth in equations (1, 2, 3).

In the case of the exemplary embodiment from FIG. 2, the crank angle φ is defined by an angle calculation unit 13 located in the simulator 2.

In the method shown, the volume of the combustion chamber of the cylinder is carried out for a crank angle range of one-half crank revolution, wherein for a crank angle of >180° the actual crank angle φ is replaced by a volume-equivalent crank angle for determining the volume of the combustion chamber. In this process, the crank angle range is divided into sub-ranges, with provision being made to determine the expansion coefficients for the series expansion of the cylinder volume for each sub-region for each engine type that is to be simulated before simulation.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:
1. A method for real-time testing of a control unit of an internal combustion engine, the method comprising:
   providing a simulator comprising a first simulator processor and a simulator I/O interface, the control unit comprises a control unit processor and a control unit I/O interface, the control unit and the simulator being connected through the simulator I/O interface forming a first data channel;
   transmitting, via the control unit, engine control data to the simulator through the first data channel;
   calculating, via the simulator, engine state variables in real time by the first simulator processor with a first sampling step size using the engine control data within a full engine model, wherein the full engine model replicates real engine mechanical dynamics and thermodynamics, including a temperature gradient and a pressure gradient of a cylinder;
   transmitting at least a portion of the engine state variables with a first transmission step size to the control unit;
   calculating, in parallel, via the simulator, at least one specific engine state variable of the engine state variables using a partial engine model with a second sampling step size that is different from the first sampling step size,
   wherein engine state variables determined in a most recent sampling step by the full engine model of the first simulator processor are provided to the partial engine model of the simulator, and wherein the at least one specific engine state variable of the engine state variables is calculated based on the engine state variables determined in the most recent sampling step by the full engine model and made available to the partial engine model.

2. The method according to claim 1, wherein the specific calculated engine state variable is transmitted to the control unit with a second transmission step size via a second data channel that is different from the first data channel.

3. The method according to claim 1, wherein the second sampling step size is smaller than the first sampling step size, and wherein the first sampling step size is an integer multiple of the second sampling step size.

4. The method according to claim 2, wherein the second transmission step size is smaller than the first transmission step size.

5. The method according to claim 2, wherein the second data channel is routed through a second simulator I/O interface that is independent of the first simulator I/O interface.

6. The method according to claim 1, wherein the partial engine model for calculating the specific engine state variable is calculated on a second simulator processor that is different from the first simulator processor.

7. The method according to claim 1, wherein the partial engine model for calculating the specific engine state variable is carried out in a different task from a task in which the full engine model for calculating all engine state variables is carried out.

8. The method according to claim 1, wherein the mechanical dynamics and thermodynamics are calculated from a system of differential equations and based on engine control variables and engine state variables, the engine state variables including a volume of an engine combustion chamber, a temperature inside the combustion chamber and a temperature gradient inside the combustion chamber.

9. The method according to claim 1, wherein the full engine model includes the engine state variable of a cylinder pressure inside a combustion chamber of the cylinder of the internal combustion engine, and wherein the partial engine model includes as a specific engine state variable the cylinder pressure inside the combustion chamber of the cylinder of the internal combustion engine.

10. The method according to claim 9, wherein the full engine model includes as additional engine state variables, and the partial engine model includes as additional specific engine state variable, a temperature inside the combustion chamber of the cylinder and/or the temperature gradient of the temperature inside the combustion chamber of the cylinder and/or a volume of the combustion chamber of the cylinder and/or the pressure gradient inside the combustion chamber of the cylinder.

11. The method according to claim 10, wherein, in the partial engine model, the temperature in the combustion chamber of the cylinder is determined by integration and the temperature is used to calculate the cylinder pressure.

12. The method according to claim 10, wherein the volume of the combustion chamber of the cylinder is determined in the partial engine model by a series expansion or via a table lookup, and wherein the volume is used to calculate the cylinder pressure.

13. The method according to claim 9, wherein the cylinder pressure is determined in the partial engine model as a function of a defined crank angle, and wherein the crank angle is defined by an angle calculation unit provided in the simulator.

14. The method according to claim 12, wherein the calculation of the volume of the combustion chamber of the cylinder is carried out for a crank angle range of one-half crank revolution of 0° to 180°, wherein for a crank angle of greater than 180° the actual crank angle is replaced by a volume-equivalent crank angle for determining the volume of the combustion chamber of the cylinder, wherein the crank angle range is divided into sub-ranges, and wherein expansion coefficients are determined for the series expansion of the cylinder volume for each sub-region for each engine type that is to be simulated before simulation.

15. The method according to claim 1, wherein the at least one specific engine state variable is calculated in parallel on the first simulator processor in a different task from a task processing the full engine model.

16. The method according to claim 1, wherein the at least one specific engine state variable of the engine state variables is calculated in parallel to the first simulator processor.

17. A control unit testing interface comprising:
a simulator, comprising:
a first simulator processor; and
a second simulator processor;
a control unit of an internal combustion engine;
a first simulator I/O interface providing a real-time connection from the simulator to the control unit, the control unit comprising a control unit processor and a control unit I/O interface,
wherein the simulator is connected to the control unit through the simulator I/O interface and the control unit I/O interface via a first data channel configured to transmit engine control data from the control unit to the simulator,
wherein a full engine model run on the first simulator processor calculates engine state variables as a function of the transmitted engine control data with a first sampling rate and stores the engine state variables in a dual-access memory,
wherein the full engine model replicates real engine mechanical dynamics and thermodynamics,
wherein the simulator transmits at least a portion of the engine state variables to the control unit at a first transmission rate,
wherein a partial engine model run on the second simulator processor calculates at least one specific engine state variable of the engine state variables at a second sampling rate that is different from the first sampling rate, the second simulator processor storing the at least one specific engine state variable in the dual-access memory,
wherein the first simulator processor provides the engine state variables to the second simulator processor at the first sampling rate, and
wherein the at least one specific engine state variable of the engine state variables is calculated based on the engine state variables determined in a most recent sampling step by the full engine model.

18. The control unit testing interface of claim 17, wherein the simulator transmits the at least one specific engine state variable at a second transmission rate, and wherein the first and second transmission rates are based on the first and second sampling rates, respectively.

19. A simulator comprising:
a first simulator processor; and
a first simulator I/O interface for real-time testing of a control unit of an internal combustion engine, the control unit comprising a control unit processor and a control unit I/O interface,
wherein the simulator is connectable to the control unit through the simulator I/O interface and the control unit I/O interface via a first data channel configured to transmit engine control data from the control unit to the simulator,
wherein a full engine model that is configured to calculate engine state variables on the first simulator processor as a function of the transmitted engine control data with a first sampling step size is maintained on the first simulator processor,
wherein the full engine model replicates real engine mechanical dynamics and thermodynamics,
wherein the simulator is configured to transmit at least a portion of the engine state variables to the control unit with a first transmission step size,
wherein a partial engine model for calculating at least one specific engine state variable of the engine state variables with a second sampling step size that is different from the first sampling step size is maintained in the simulator,
wherein the first sampling step size is preset and the second sampling step size is variable depending on the mechanical dynamics,
wherein the partial engine model for calculating the specific engine state variable is carried out in a first task different from a second task in which the full engine model for calculating all engine state variables is carried out,
wherein the first task and the second task are carried out on the first simulator processor, and
wherein the at least one specific engine state variable of the engine state variables is calculated based on the engine state variables determined in a most recent sampling step by the full engine model, and the first task provides engine state variables directly to the second task.

20. The simulator of claim 19, wherein the second sampling step size is smaller than the first sampling step size, and wherein engine state variables are supplied to the control unit at a slower rate than the at least one specific engine state variable.

21. A method for real-time testing of a control unit of an internal combustion engine, the method comprising:
providing a simulator comprising a first simulator processor and a simulator I/O interface, the control unit comprises a control unit processor and a control unit I/O interface, the control unit and the simulator being connected through the simulator I/O interface forming a first data channel;
transmitting, via the control unit, engine control data to the simulator through the first data channel;
calculating, via the simulator, engine state variables in real time by the first simulator processor with a first sampling step size using the engine control data within a full engine model, wherein the full engine model replicates real engine mechanical dynamics and thermodynamics, including a temperature gradient and a pressure gradient of a cylinder;
transmitting at least a portion of the engine state variables with a first transmission step size to the control unit;
calculating, in parallel to the first simulator processor, via the simulator, at least one specific engine state variable of the engine state variables using a partial engine model with a second sampling step size that is different from the first sampling step size,
wherein engine state variables determined in a most recent sampling step by the full engine model of the first simulator processor are provided to the partial engine model of the simulator, and
wherein the at least one specific engine state variable of the engine state variables is calculated based on the engine state variables determined in the most recent sampling step by the full engine model.

* * * * *